United States Patent Office.

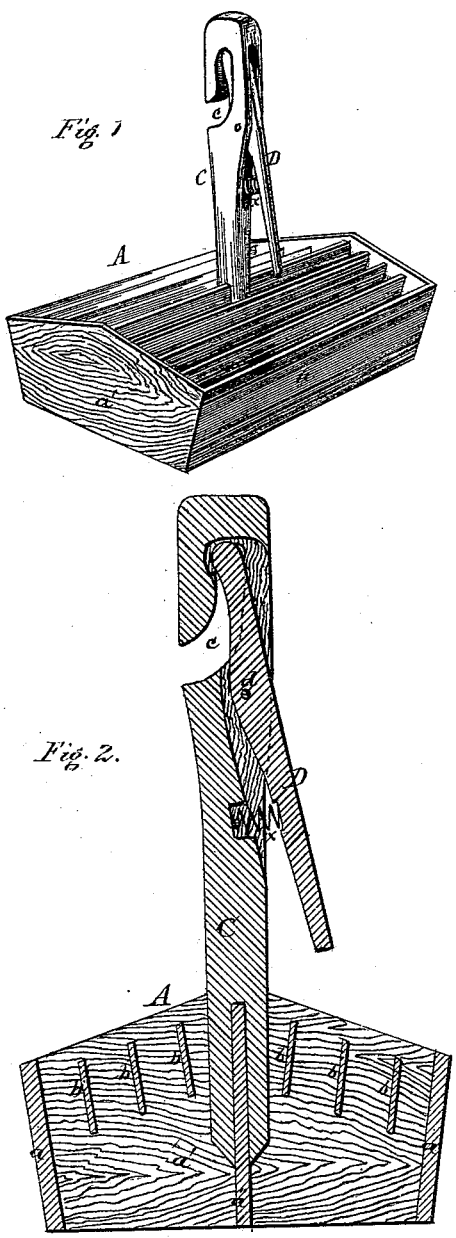

V. REIFSNIDER, OF CHICAGO, ILLINOIS.

Letters Patent No. 93,905, dated August 17, 1869.

IMPROVED CLOTHES-PIN HOLDER.

The Schedule referred to in these Letters Patent and making part of the same.

*To all whom it may concern:*

Be it known that I, V. REIFSNIDER, of Chicago, in the county of Cook, and in the State of Illinois, have invented a new and useful Improvement in Clothes-Pin Holders; and do hereby declare that the following is a full, clear, and exact description thereof, reference being had to the accompanying drawing, making a part of this specification, in which—

Figure 1 is a perspective view, and

Figure 2, a central cross-section of my improved device.

Letters of like name and kind refer to like parts in each of the figures.

The object of my invention is to furnish a convenient and compact portable receptacle for clothes-pins; and to this end, It consists in a suitable box or frame, provided with a series of parallel slats for holding the pins in a vertical position, and having a vertical standard, or handle, provided at its upper end with an open curved slot, by means of which said handle and holder may be suspended from a clothes-line.

It further consists, in combination with the above, in the employment of a lever so pivoted, within said handle, as that one of its ends is, by means of a spring, caused to press against said line, when within said slot, and firmly secure the holder thereto, whatever its inclination.

In the annexed drawing—

A represents the body of the holder, consisting of the side and end pieces $a$ and $a'$, respectively, the latter of which, at their upper ends, slope upward from the outer side to the centre, as seen in fig. 2.

Through the centre of the holder, lengthwise, extends a vertical partition $a''$, its ends being secured to the end pieces $a'$.

$b\ b$ represent a series of slats, secured at their ends to the end-pieces $a'$, so as to occupy positions parallel with and equidistant from each other and the sides $a$ and partition $a'$. These slats are placed with their sides in a vertical position, and, being of suitable thickness to permit a clothes-pin to be passed over their edges, serve as a support for said pins, which are always retained in a vertical position.

C represents a standard, or handle, secured to and extending upward from the centre of the partition $a''$, near the upper end of which is a slot, $c$, which extends downward and outward in a curve, by means of which said handle may be suspended from a clothes-line.

In order that the holder may be prevented from slipping upon the line when, as is usually the case, said line is not horizontal, a lever, D, is pivoted at $d$, within a corresponding slot in the handle, so that its upper end may pass through the slot $c$, and rest against the opposite side.

A spiral spring, $x$, placed between the handle and the lower end of the lever, presses the latter outward, and causes its upper end to bear against and securely bind the line when placed within the slot $c$.

The holder may be instantly released from the line by clasping the handle and lever with sufficient pressure to close them together.

This device furnishes a convenient and compact means for storing clothes-pins, when not in use, and from the accessible position occupied by each pin, and from the ease with which the holder can be suspended from and secured to the line, it will be readily seen that great convenience will result from its use.

Having thus fully set forth the nature and merits of my invention,

What I claim as new, and desire to secure by Letters Patent, is—

The within-described holder for clothes-pins, consisting of the body A, provided with the slats $b\ b$, standard or handle C, provided with the slot $c$, lever D, and spring $x$, or its equivalent, all constructed and arranged substantially as and for the purpose specified.

In testimony that I claim the foregoing, I have hereunto set my hand, this 20th day of July, 1869.

V. REIFSNIDER.

Witnesses:
I. D. RICHARDS,
WM. HARTELL.